United States Patent
Nishijima et al.

(10) Patent No.: US 7,347,062 B2
(45) Date of Patent: Mar. 25, 2008

(54) EJECTOR CYCLE

(75) Inventors: Haruyuki Nishijima, Obu (JP); Hirotsugu Takeuchi, Nagoya (JP); Toru Ikemoto, Chiryu (JP); Hisatsugu Matsunaga, Anjo (JP); Takeharu Asaoka, Toyota (JP)

(73) Assignee: DENSO Corporation, Kariya (JP)

( * ) Notice: Subject to any disclaimer, the term of this patent is extended or adjusted under 35 U.S.C. 154(b) by 89 days.

(21) Appl. No.: 10/868,619

(22) Filed: Jun. 15, 2004

(65) Prior Publication Data

US 2004/0255610 A1 Dec. 23, 2004

(30) Foreign Application Priority Data

Jun. 18, 2003 (JP) .............................. 2003-173845

(51) Int. Cl.
F25B 1/06 (2006.01)

(52) U.S. Cl. ........................................ 62/500; 62/324.4

(58) Field of Classification Search ................. 62/500, 62/324.4
See application file for complete search history.

(56) References Cited

U.S. PATENT DOCUMENTS

| | | | | |
|---|---|---|---|---|
| 3,496,735 A | * | 2/1970 | Haisma ....................... | 62/500 |
| 3,757,532 A | | 9/1973 | Brandt | |
| 3,777,508 A | * | 12/1973 | Imabayashi et al. ........ | 62/324.3 |
| 4,342,200 A | * | 8/1982 | Lowi, Jr. ..................... | 62/191 |
| 4,660,384 A | * | 4/1987 | Pallanch ...................... | 62/81 |
| 5,444,987 A | * | 8/1995 | Alsenz ........................ | 62/116 |
| 6,550,265 B2 | | 4/2003 | Takeuchi et al. | |
| 6,584,794 B2 | * | 7/2003 | Takeuchi et al. ............. | 62/278 |
| 6,729,149 B2 | | 5/2004 | Takeuchi | |
| 2003/0005717 A1 | * | 1/2003 | Takeuchi et al. ............. | 62/278 |
| 2003/0145613 A1 | * | 8/2003 | Sakai et al. .................. | 62/191 |

FOREIGN PATENT DOCUMENTS

| | | |
|---|---|---|
| CN | 2171089 Y | 7/1994 |
| JP | A-62-049159 | 3/1987 |
| JP | 63-183359 | 7/1988 |
| JP | 6-11197 | 1/1994 |
| JP | A-10-160298 | 6/1998 |
| JP | 10-213356 | 8/1998 |
| JP | 2001-289536 | 10/2001 |

OTHER PUBLICATIONS

Office Action from corresponding Japanese Application No. 2003-173845 dated Dec. 13, 2006.
Office Action dated Nov. 2, 2007 in Chinese Application No. 200610107446.X with English translation.

* cited by examiner

Primary Examiner—Cheryl Tyler
Assistant Examiner—Emily Iris Nalven
(74) Attorney, Agent, or Firm—Harness, Dickey & Pierce, PLC

(57) ABSTRACT

An ejector cycle with an ejector includes a nozzle for decompressing refrigerant. A receiver for storing refrigerant is disposed at a refrigerant outlet side of a condenser. A bypass passage and a switching valve for opening and closing the bypass passage are provided so that high-temperature refrigerant discharged from a compressor is introduced into an evaporator while bypassing the condenser in a defrosting operation. When the defrosting operation is set, the switching valve is opened while a fan for blowing cool air to the condenser is operated. A part of refrigerant discharged from the compressor flows into the evaporator to remove frost on a surface of the evaporator.

12 Claims, 7 Drawing Sheets

EJECTOR CYCLE

CROSS-REFERENCE TO RELATED APPLICATION

This application is related to and claims priority from Japanese Patent Application No. 2003-173845 filed on Jun. 18, 2003, the contents of which are hereby incorporated by reference.

BACKGROUND OF THE INVENTION

1. Field of the Invention

The present invention relates to an ejector cycle with a defrosting operation of an evaporator.

2. Description of Related Art

In an ejector cycle described in JP-A-6-11197, refrigerant is decompressed and expanded in a nozzle of an ejector so that gas refrigerant evaporated in an evaporator is sucked, and pressure of refrigerant to be sucked into a compressor is increased by converting expansion energy to pressure energy. Further, in the ejector cycle, refrigerant flowing out of the ejector flows into a gas-liquid separator to be separated into gas refrigerant and liquid refrigerant in the gas-liquid separator. Then, the liquid refrigerant in the gas-liquid separator is supplied to the evaporator, and the gas refrigerant in the gas-liquid separator is supplied to the compressor.

Accordingly, the ejector cycle has a first refrigerant circulation where refrigerant circulates the gas-liquid separator→the evaporator→a pressure increasing portion of the ejector→the gas-liquid separator in this order, and a second refrigerant circulation where refrigerant circulates the compressor→a condenser→the ejector→the gas-liquid separator→the compressor in this order. Accordingly, in the ejector cycle, it is difficult to introduce high-temperature refrigerant to the evaporator in order to defrost the evaporator.

Generally, an expansion-valve refrigerant cycle has only one refrigerant flow where refrigerant circulates through a compressor→a condenser→an expansion valve→an evaporator→the compressor in this order. Therefore, in this expansion-valve refrigerant cycle, when the expansion valve is fully opened, high-temperature refrigerant flows into the evaporator, and defrosting operation of the evaporator can be readily performed.

In contrast, in the ejector cycle, the defrosting operation of the evaporator cannot be performed by using high-temperature refrigerant flowing from the condenser.

SUMMARY OF THE INVENTION

In view of the foregoing problems, it is an object of the present invention to provide an ejector cycle having an ejector, which effectively performs defrosting operation of an evaporator.

It is another object of the present invention to provide an ejector cycle having an ejector, which prevents pressure of high-pressure side refrigerant from being excessively increased in a defrosting operation or at a time immediately after a switching from the defrosting operation to a general operation.

According to an aspect of the present invention, an ejector cycle includes a compressor for compressing refrigerant, a condenser for cooling high-pressure refrigerant discharged from the compressor, an evaporator for evaporating low-pressure refrigerant after being decompressed, an ejector, and a gas-liquid separator for separating refrigerant from the ejector into gas refrigerant and liquid refrigerant. The ejector includes a nozzle for decompressing and expanding refrigerant flowing from the condenser by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the evaporator. In the ejector cycle, a bypass passage through which refrigerant discharged from the compressor flows into a refrigerant inlet of the evaporator while bypassing at least the condenser is provided, a switching valve for opening and closing the bypass passage is provided in the bypass passage, and a receiver is disposed upstream of the nozzle of the ejector at a refrigerant outlet side of the condenser to store refrigerant therein. Accordingly, in a defrosting operation where the refrigerant discharged from the compressor flows into the evaporator through the bypass passage, surplus refrigerant flows into the condenser, and is stored in the receiver while being condensed in the condenser and the receiver. Thus, even when the capacity of the condenser is set smaller, the surplus refrigerant can be stored in the receiver, and it can prevent a hot-gas refrigerant amount more than a necessary amount from being introduced to the evaporator in the defrosting operation. As a result, it can prevent the pressure of refrigerant discharged from the compressor from being excessively increased.

Preferably, a blower is provided for blowing air toward the condenser to cool refrigerant in the condenser. Further, in the defrosting operation, the switching valve is opened so that at least a part of the refrigerant discharged from the compressor is introduced into the evaporator, and the blower is operated. Therefore, hot gas refrigerant flowing into the condenser can be effectively cooled and condensed, and it can accurately prevent the hot gas refrigerant more than the necessary amount from being introduced into the evaporator in the defrosting operation.

According to another aspect of the present invention, when the defrosting operation is set, the switching valve is opened so that at least a part of the refrigerant discharged from the compressor is introduced into the evaporator to remove frost on a surface of the evaporator. In addition, at least for a predetermined time after the defrosting operation is finished, a preparative operation, where the switching valve is opened while the compressor is stopped, is performed. Accordingly, by a pressure difference between the side of the condenser and the side of the evaporator due to high-pressure refrigerant stored at the side of the condenser, it is possible to move the liquid refrigerant stored on the side of the condenser toward the evaporator through the bypass passage. Therefore, it can prevent condensation capacity of the condenser from being decreased, thereby preventing the pressure of the high-pressure refrigerant from being excessively increased in the defrosting operation of at a time immediately after switching from the defrosting operation to the general operation.

According to a further another aspect of the present invention, a variable throttle device is disposed at a refrigerant outlet side of the condenser, for decompressing refrigerant before flowing into the nozzle of the ejector. Further, the variable throttle device changes its throttle open degree in accordance with a super-heating degree of refrigerant at a refrigerant outlet side of the evaporator. In this case, when a defrosting operation is set, the switching valve is opened so that at least a part of the refrigerant discharged from the compressor is introduced into the evaporator to remove frost on the surface of the evaporator. Further, at least for a predetermined time after the defrosting operation is finished, a preparative operation, where the variable throttle device is opened while the compressor is stopped, is performed. Accordingly, in the preparative operation, it is possible to move the liquid refrigerant stored at least in the condenser to the side of the evaporator through the ejector by using the pressure difference.

For example, in a general operation where the refrigerant discharged from the compressor is cooled and condensed in the condenser and refrigerant is evaporated in the evaporator, the variable throttle device changes its throttle open degree in accordance with the super-heating degree of the refrigerant at the refrigerant outlet side of the evaporator. In the defrosting operation, the switching valve is opened and the variable throttle device is closed. In addition, in the preparative operation, the variable throttle device is fully opened.

According to a further another aspect of the present invention, the ejector cycle is provided with an another bypass passage through which refrigerant from the condenser bypasses at least the nozzle, and an another switching valve for opening and closing the another bypass passage. In this case, when a defrosting operation is set, the switching valve is opened and the another switching valve is closed so that at least a part of the refrigerant discharged from the compressor is introduced into the evaporator to remove frost on the surface of the evaporator. Furthermore, at least for a predetermined time after the defrosting operation is finished, a preparative operation, where the another switching valve is opened, is performed. Accordingly, in the preparative operation, it is possible to move the liquid refrigerant stored in the condenser to the side of the evaporator through the another bypass passage. The another bypass passage can be provided such that the refrigerant from the condenser bypasses the variable throttle device and the nozzle of the ejector through the another bypass passage.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

First Embodiment

Figure 1:
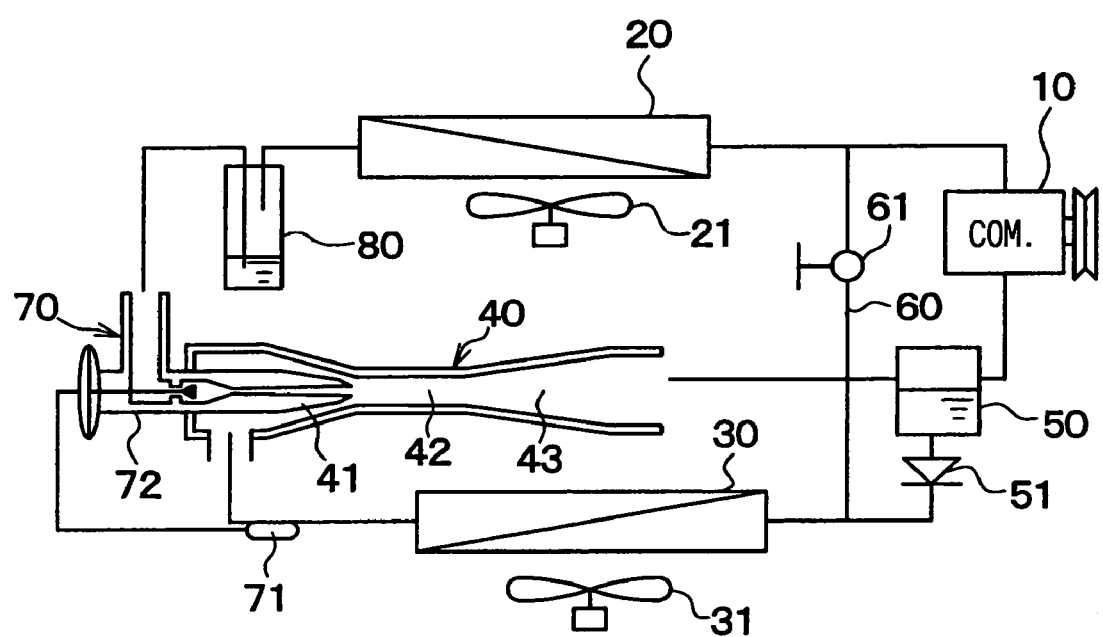
FIG. 1 is a schematic diagram showing an ejector cycle including an ejector according to a first embodiment of the present invention.

In the first embodiment, an ejector cycle is typically used as a vapor compression refrigerator of a vehicle air conditioner or a stationary air conditioner for a room. As shown in FIG. 1, a compressor 10 is an electric compressor for sucking and compressing refrigerant circulated in the ejector cycle. A condenser 20 (cooler, radiator) is a high-pressure heat exchanger for cooling and condensing high-temperature and high-pressure refrigerant discharged from the compressor 10 by performing heat-exchange operation between outside air and the high-temperature and high-pressure refrigerant. A fan 21 (blower) is provided for blowing cool air (outside air) toward the condenser 20.

Further, an evaporator 30 is a low-pressure heat exchanger for cooling air to be blown into a compartment by evaporating liquid refrigerant, more specifically, by performing heat-exchange operation between the air and low-pressure refrigerant. A fan 31 is an electrical blower for blowing air into the evaporator 30 and for blowing the air after passing through the evaporator 30 into the compartment.

An ejector 40 sucks refrigerant evaporated in the evaporator 30 while decompressing and expanding refrigerant flowing out of the condenser 20 in a nozzle 41, and increases pressure of refrigerant to be sucked into the compressor 10 by converting expansion energy of refrigerant to pressure energy of refrigerant.

The ejector 40 includes the nozzle 41, a mixing portion 42, and a diffuser 43. The nozzle 41 decompresses and expands high-pressure refrigerant flowing into the ejector 40 in iso-enthalpy by converting pressure energy of the high-pressure refrigerant from the condenser 20 to speed energy of refrigerant. The mixing portion 42 sucks refrigerant evaporated in the evaporator 30 by using an entrainment function of high-speed refrigerant stream injected from the nozzle 41, and mixes the sucked refrigerant and the refrigerant jetted from the nozzle 41. Further, the diffuser 43 mixes the refrigerant injected from the nozzle 41 and the refrigerant sucked from the evaporator 30, and increases the refrigerant pressure by converting speed energy of the mixed refrigerant to pressure energy thereof.

In the mixing portion 42, a drive stream of refrigerant from the nozzle 41 and a suction stream of the refrigerant from the evaporator 30 are mixed so that their momentum sum is conserved, thereby increasing refrigerant pressure. In the diffuser 43, because a refrigerant passage sectional area gradually increases toward its outlet side, the refrigerant speed energy (dynamic pressure) is converted to refrigerant pressure energy (static pressure). Thus, in the ejector 40, refrigerant pressure is increased by both of the mixing portion 42 and the diffuser 43. Accordingly, in the ejector 40, a pressure-increasing portion is constructed with the mixing portion 42 and the diffuser 43.

In the first embodiment, "Laval nozzle" (refer to Fluid Engineering published by Tokyo University Publication) is adopted as the nozzle 41 to accelerate refrigerant injected from the nozzle 41 equal to or higher than the sound velocity. Here, the Laval nozzle 41 includes a throttle having the smallest passage area in its refrigerant passage. However, a nozzle tapered toward its outlet side can be used as the nozzle 41.

In FIG. 1, refrigerant is discharged from the ejector 40, and flows into a gas-liquid separator 50. The gas-liquid separator 50 separates the refrigerant from the ejector 40 into gas refrigerant and liquid refrigerant, and stores the separated gas refrigerant and the separated liquid refrigerant therein. The gas-liquid separator 50 includes a gas-refrigerant outlet connected to a suction port of the compressor 10, and a liquid-refrigerant outlet connected to an inlet side of the evaporator 30. Accordingly, in the ejector cycle, liquid refrigerant in the gas-liquid separator 50 flows into the evaporator 30 while refrigerant from the condenser 20 is decompressed in the nozzle 41 of the ejector 40.

A check valve 51 is provided in a refrigerant passage through which liquid refrigerant is supplied from the gas-liquid separator 50 toward the evaporator 30, to only allow a refrigerant flow from the gas-liquid separator 50 toward the evaporator 30. A bypass passage 60 is a refrigerant passage through which high-temperature high-pressure refrigerant (hot gas refrigerant) discharged from the compressor 10 can be directly introduced into a refrigerant inlet of the evaporator 30 while bypassing the condenser 20 and the ejector 40. A switching valve 61 is provided in the bypass passage 60 to open and close the bypass passage 60. The switching valve 61 is also used as a decompression means for decompressing high-pressure refrigerant discharged from the compressor 10 to be lower than a pressure-resistance pressure of the evaporator 30.

A variable throttle device 70 is disposed in a refrigerant passage between the condenser 20 and the ejector 40. The variable throttle device 70 is an expansion valve disposed upstream from the nozzle 41 of the ejector 40, to decompress high-pressure refrigerant flowing from the condenser 20 to a gas-liquid two-phase state. The variable throttle device 70 controls its throttle open degree so that a super-heating degree of refrigerant at a refrigerant outlet side of the evaporator 30 becomes in a predetermined range (e.g., 0.1-10 degrees). The variable throttle device 70 can have a structure of a thermal expansion valve that is generally known.

Specifically, the variable throttle device 70 includes a temperature sensing portion 71 for sensing a refrigerant temperature at a refrigerant outlet side of the evaporator 30. The variable throttle device 70 controls its throttle open degree by a balance between a gas pressure in the temperature sensing portion 71, a refrigerant pressure in the evaporator 30 and a spring force of a spring member.

For example, when the pressure inside the evaporator 30 is high, a thermal load in the evaporator 30 becomes higher, and a refrigerant super-heating degree at the refrigerant outlet side of the evaporator 30 becomes larger. In this case, the throttle open degree of the variable throttle device 70 is made smaller, and the flow speed of refrigerant (drive flow) jetted from the nozzle 41 is set larger, so that a refrigerant amount circulated into the evaporator 30 is increased.

In contrast, when the pressure inside the evaporator 30 is low, the thermal load in the evaporator 30 becomes lower, and the refrigerant super-heating degree at the refrigerant outlet side of the evaporator 30 becomes lower. In this case, the throttle open degree of the variable throttle device 70 is made larger, and the flow speed of refrigerant (drive flow) jetted from the nozzle 41 is set smaller, so that the refrigerant amount circulated into the evaporator 30 is decreased.

In this embodiment, a valve case body 72 of the variable throttle device 70 is integrated with the ejector 40, so that a decompression portion constructed with the variable throttle device 70 and the ejector 40 can be downsized.

Figure 2A:
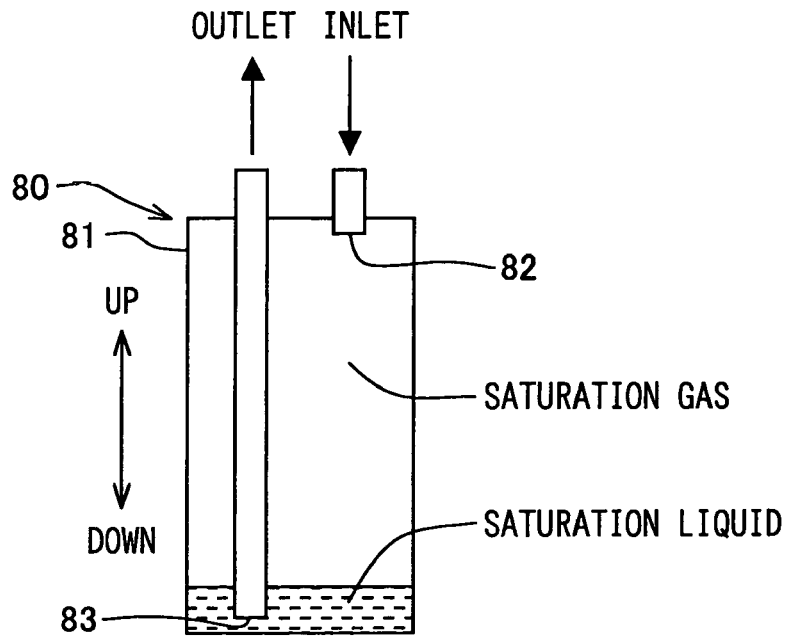
FIGS. 2A and 2B are schematic sectional views showing a receiver in the ejector cycle in FIG. 1.
Figure 2B:
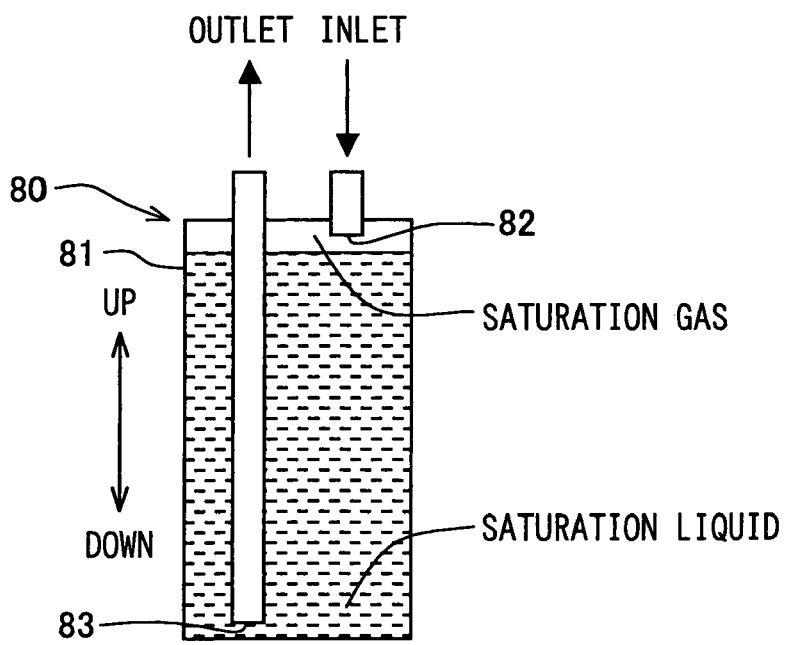

A receiver 80 is disposed at a refrigerant outlet side of the condenser 20 to store liquid refrigerant therein. The liquid refrigerant stored in the receiver 80 is supplied to the variable throttle device 70 and the ejector 40 to be decompressed. The receiver 80 has a refrigerant storage tank structure similar to a very known receiver used in an expansion valve cycle. Specifically, as shown in FIGS. 2A and 2B, the receiver 80 includes a refrigerant inlet 82 opened at a top side of a tank body 81, and a refrigerant outlet 83 opened at a bottom side of the tank body 81. FIG. 2A shows a liquid surface position in a general operation, and FIG. 2B shows a liquid surface position in a defrosting operation. In FIGS. 2A, 2B, the capacity of the tank body 81 is set so that the liquid surface of the liquid refrigerant is positioned at a lower side of the refrigerant inlet 82 and is positioned at an upper side of the refrigerant outlet 83 in any operation of the ejector cycle. Refrigerant from the condenser 20 flows into the tank body 81 through the refrigerant inlet 82, and liquid refrigerant separated in the tank body 81 flows toward the variable throttle device 70 through the refrigerant outlet 83.

Components such as the fans 21, 31 and the compressor 10 are controlled by an electronic control unit (ECU). In this embodiment, one of the general operation (refrigerating operation) and the defrosting operation can be set by the electronic control unit or can be set manually.

Next, operation of the ejector cycle according to the first embodiment will be now described.

(1) General Operation (Cooling Operation, Refrigerating Operation)

When the general operation (refrigerating operation) is set, the switching valve 61 is closed so that refrigerant discharged from the compressor 10 circulates toward the condenser 20. Then, high-pressure refrigerant discharged from the compressor 10 is cooled in the condenser 20 and is decompressed in the variable throttle device 70 in iso-enthalpy to a gas-liquid two-phase state. Thereafter, refrigerant from the variable throttle device 70 is further decompressed in the nozzle 41 of the ejector 40 in iso-enthalpy, so that the refrigerant speed at the outlet of the nozzle 41 of the ejector 40 becomes equal to or higher than the speed of the sound. Thereafter, refrigerant from the outlet of the nozzle 41 flows into the mixing portion 42 of the ejector 40.

Refrigerant flowing from the receiver 80 into the variable throttle device 70 is decompressed by the variable throttle device 70 so as to boil once at an inlet side of the nozzle 41. Therefore, bubbles are generated by the variable throttle device 70, and boiling cores are generated after the bubbles disappear at the inlet side of the nozzle 41. Refrigerant with the boiling cores is further boiled by the nozzle 41, so that fine liquid drops (i.e., minute liquid drops) of refrigerant are generated. Because the boiling of refrigerant is facilitated in the nozzle 41, the generation of minute liquid drops of the refrigerant can be facilitated in the nozzle 41. Accordingly, the nozzle efficiency can be effectively improved.

In the first embodiment, freon is used as the refrigerant so that a refrigerant pressure at the high pressure side is lower than the critical pressure of the refrigerant. Therefore, refrigerant is condensed in the condenser 20, and the refrigerant pressure flowing into the nozzle 41 is lower than the critical pressure of the refrigerant.

The mixing portion 42 sucks gas refrigerant evaporated in the evaporator 30 by using the entrainment function of high-speed refrigerant stream injected from the nozzle 41, and mixes the sucked refrigerant and the injected refrigerant therein. Further, the diffuser 43 mixes the refrigerant injected from the nozzle 41 and the refrigerant sucked from the evaporator 30, and increases the refrigerant pressure. Therefore, the ejector efficiency can be improved. Accordingly, low-pressure refrigerant in the gas liquid separator 50 circulates the evaporator 30 and the pressure increasing portion of the ejector 40, in this order, and returns to the gas-liquid separator 50.

According to the first embodiment of the present invention, the refrigerant is decompressed by the variable throttle device 70 to the gas-liquid two-phase refrigerant at an upstream side of the nozzle 41. Therefore, it can prevent the refrigerant from being throttled more than a necessary degree while the ejector efficiency can be effectively improved. Further, because the throttle open degree of the variable throttle device 70 is controlled based on the thermal load (e.g., the super-heating degree of the refrigerant at the outlet side of the evaporator 30), the ejector efficiency of the ejector cycle can be improved even when the cooling load of the ejector cycle is changed. Thus, the ejector cycle can be used in a wide load variation area, while the ejector efficiency, the nozzle efficiency and the cooling capacity of the ejector cycle are improved in the general operation.

(2) Defrosting Operation

When the defrosting operation is set, the compressor 10 is operated while the switching valve 61 is opened. Further, the variable throttle device 70 is closed. In this case, high-temperature refrigerant (hot gas refrigerant) discharged from the compressor 10 is supplied to the evaporator 30 to heat an inner side of the evaporator 30. Therefore, frost adhering on the surface of the evaporator 30 is removed.

In the defrosting operation, the refrigerant inlet side of the condenser 20 is always opened. In addition, the variable throttle device 70 becomes in a fully closed state, when the hot gas refrigerant is supplied to the evaporator 30 so that a super-heating degree of the refrigerant at the refrigerant outlet side of the evaporator 30 becomes greatly large. Accordingly, surplus refrigerant unnecessary in the defrosting operation flows toward the condenser 20, and is stored in the receiver 80 while being condensed in the condenser 20 and the receiver 80.

Accordingly, even when the volume of the condenser 20 is small and the surplus refrigerant cannot be stored in the condenser 20, it can prevent a gas refrigerant amount more than a necessary amount from being circulated to the evaporator 30 in the defrosting mode. Accordingly, it can prevent the discharge pressure of refrigerant discharged from the compressor 10 from being excessively increased. Further, it can prevent a large amount of liquid refrigerant from being stored in the condenser 20, thereby preventing the condensing capacity of the condenser 20 from being decreased. Thus, in the first embodiment, it can prevent the pressure of the high-pressure refrigerant from being excessively increased in the defrosting operation or at a time immediately after a switching from the defrosting operation to the general operation. Therefore, the ejector cycle can be stably operated.

Figure 3:
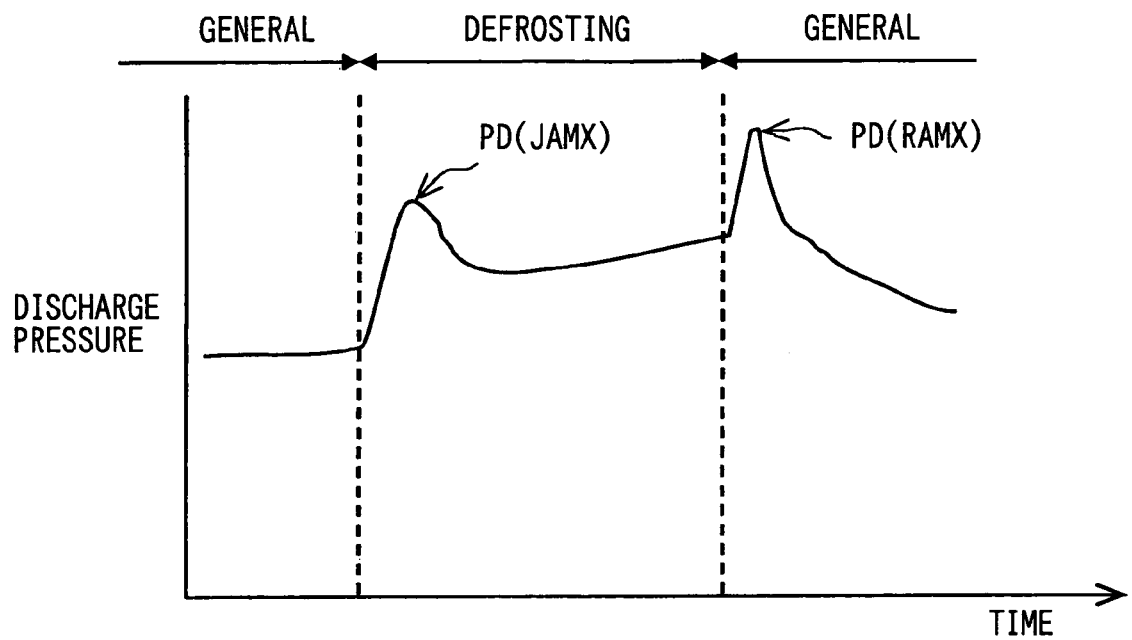
FIG. 3 is a graph showing a change of a discharge pressure of refrigerant from a compressor in a defrosting operation and in a general operation, according to the first embodiment.

FIG. 3 shows a change of the discharge pressure of the refrigerant from the compressor 10. In FIG. 3, PD(JAMX) indicates the maximum discharge pressure of the refrigerant discharged from the compressor 10 in the defrosting operation, and PD(RAMX) indicates the maximum discharge pressure of the refrigerant discharged from the compressor 10 in the general operation, in the first embodiment. As shown in FIG. 3, in the first embodiment, the maximum discharge pressure PD (JAMX) of the refrigerant discharged from the compressor 10 in the defrosting operation can be set smaller than the maximum discharge pressure PD(RAMX) of the refrigerant discharged from the compressor 10 in the general operation after the defrosting operation is performed.

Figure 11:
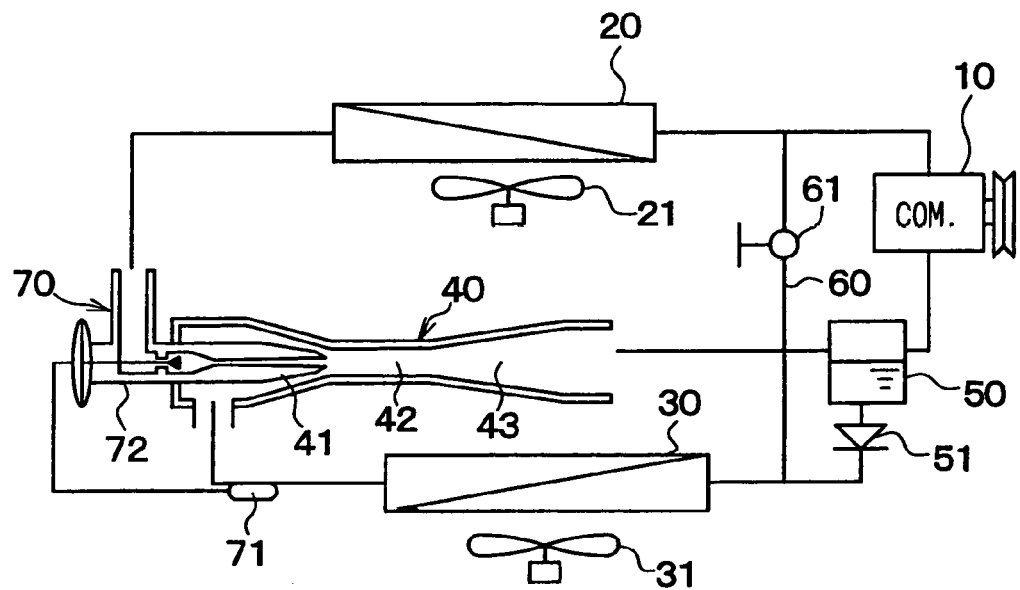
FIG. 11 is a schematic diagram showing an ejector cycle in the comparison example.
Figure 12:
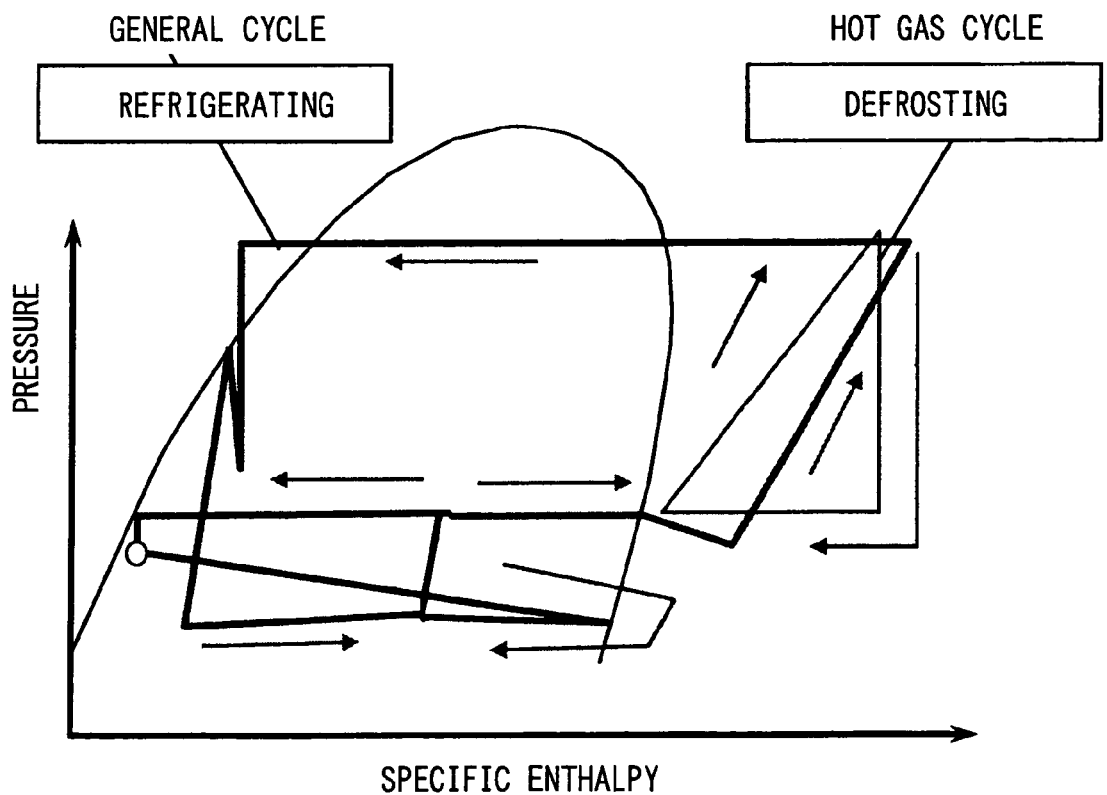
FIG. 12 is Mollier diagram (p-h diagram) showing operation of the ejector cycle in FIG. 11.

FIG. 11 shows a comparison example performed by inventors of the present application, where the receiver 80 of the first embodiment is not provided. In this comparison example, gas refrigerant having a small density is circulated as shown by the thin line of FIG. 12 without a condensation in the defrosting operation, as compared with the general operation indicated by the heavy line in FIG. 12. In the comparison example of FIG. 11, the surplus refrigerant unnecessary in the defrosting operation stays in the condenser 20 while being condensed in the condenser 20. Accordingly, when the volume (capacity) of the condenser 20 is set small, a sufficient amount of the surplus refrigerant cannot be stored in the condenser 20. Therefore, a gas refrigerant amount more than the necessary amount circulates to the evaporator 30 in the defrosting operation, and the discharge pressure of refrigerant discharged from the compressor 10 may be excessively increased. In this case, a safety device of the ejector cycle is operated in the defrosting operation or at a time immediately after the switching from the defrosting operation to the refrigerating operation.

Figure 4:
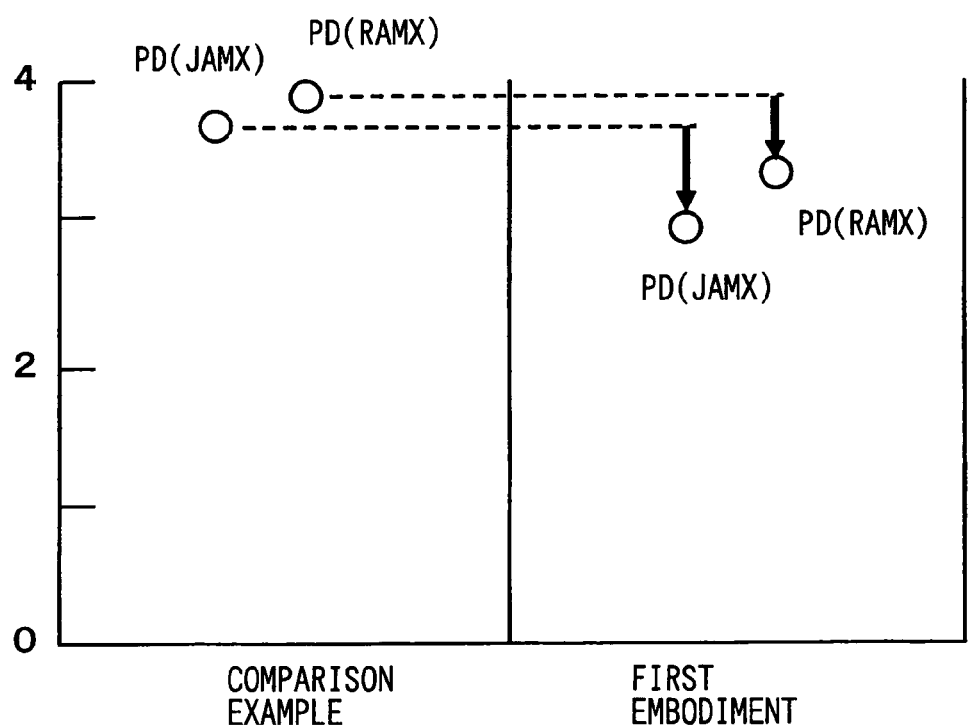
FIG. 4 is a graph showing a maximum discharge pressure PD(RAMX) of refrigerant from the compressor in the general operation and a maximum discharge pressure PD(JAMX) of refrigerant from the compressor in the defrosting operation according to the first embodiment, and showing a maximum discharge pressure PD(RAMX) in a general operation and a maximum discharge pressure PD(JAMX) in a defrosting operation according to a comparison example.

According to first embodiment of the present invention, because the receiver 80 is provided downstream from the condenser 20 in a refrigerant flow. Therefore, it can prevent a gas refrigerant amount more than the necessary amount from being circulated to the evaporator 30 in the defrosting mode, even when the volume of the condenser 20 is small and the surplus refrigerant cannot be stored in the condenser 20. Accordingly, it can prevent the discharge pressure of refrigerant discharged from the compressor 10 from being excessively increased. As shown in FIG. 4, in the first embodiment, the maximum pressure PD(JAMX), PD(RAMX) of high-pressure refrigerant can be reduced, as compared with that in the comparison example. In the experiments of FIGS. 3, 4, the outside air temperature around the condenser 20 is 40° C., and the rotation speed of the compressor 10 is set at 3600 rpm. Further, the defrosting operation is performed while fan 21 is stopped.

In the above-described first embodiment, a general receiver used for an expansion valve cycle is used as the receiver 80. However, a receiver having a desiccant or a filter can be used as the receiver 80.

Second Embodiment

In the above-described first embodiment, the defrosting operation is performed while the fan 21 is stopped. However, in the second embodiment, the defrosting operation is performed while the fan 21 is operated.

In the second embodiment, because the fan 21 is operated in the defrosting operation, hot gas refrigerant flowing into the condenser 20 can be sufficiently condensed in the condenser 20, and it can prevent a gas refrigerant amount more than the necessary amount from being circulated to the evaporator 30 in the defrosting operation.

Figure 5:
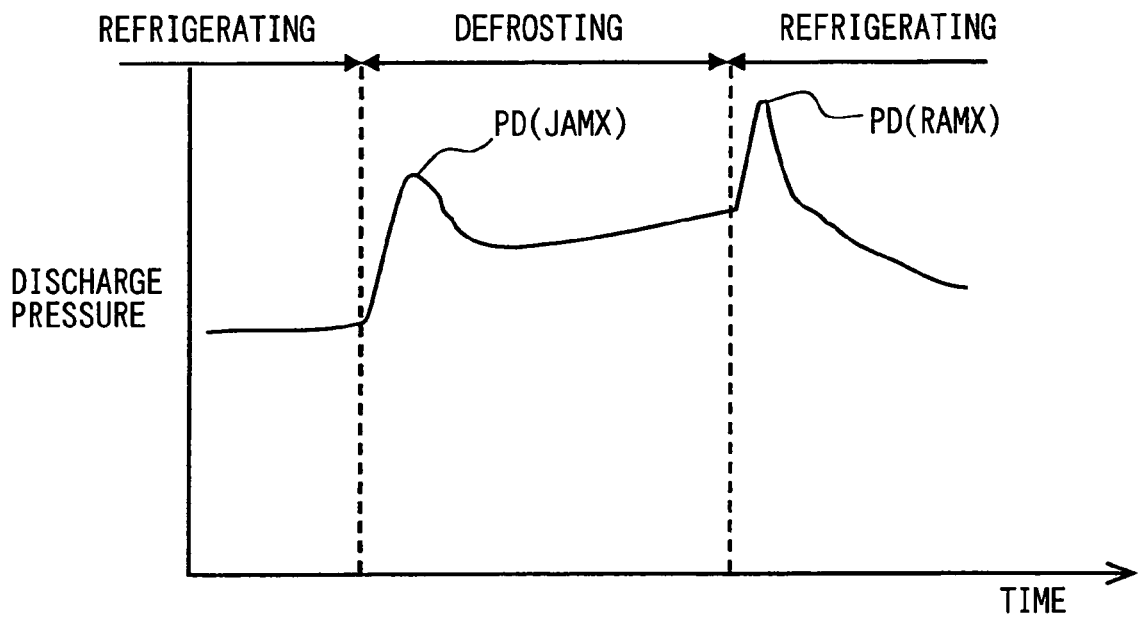
FIG. 5 is a graph showing a change of a discharge pressure of refrigerant from a compressor in a defrosting operation and in a refrigerating operation (general operation), according to a second embodiment of the present invention.
Figure 6:
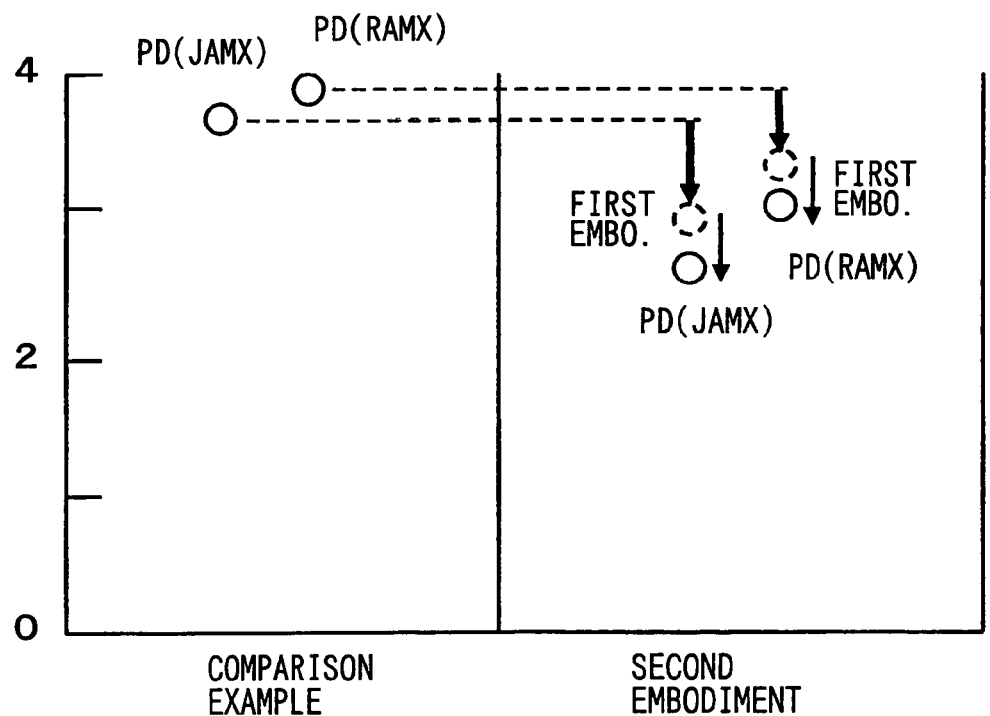
FIG. 6 is a graph showing a maximum discharge pressure PD(RAMX) of refrigerant from the compressor in the general operation and a maximum discharge pressure PD(JAMX) of refrigerant from the compressor in the defrosting operation according to the second embodiment, and showing the maximum discharge pressure PD(RAMX) in the general operation and the maximum discharge pressure PD(JAMX) in the defrosting operation according to the comparison example.

FIG. 5 shows a change of the discharge pressure of the refrigerant discharged from the compressor 10 in the second embodiment. In FIG. 5, PD(JAMX) indicates the maximum discharge pressure of the refrigerant discharged from the compressor 10 in the defrosting operation, and PD(RAMX) indicates the maximum discharge pressure of the refrigerant discharged from the compressor 10 in the general operation, in the second embodiment. As shown in FIG. 6, in the second embodiment, the maximum discharge pressure PD(RAMX) in the general operation (refrigerating operation) and the maximum discharge pressure PD(JAMX) in the defrosting operation can be reduced as compared with the comparison example, more than the first embodiment. Accordingly, it can effectively prevent the pressure of the high-pressure side refrigerant from being excessively increased.

In the experiments of FIGS. 5, 6, the outside air temperature around the condenser 20 is 40° C., and the rotation speed of the compressor 10 is set at 3600 rpm.

In the above-described second embodiment, the fan 21 is automatically operated in accordance with a start of the defrosting operation. However, in the second embodiment, the fan 21 can be operated when the pressure of the high-pressure side refrigerant is higher than a first predetermined pressure, and the fan 21 can be stopped when the pressure of the high-pressure side refrigerant is lower than a second predetermined pressure. The first predetermined pressure can be set equal to the second predetermined pressure or can be set different from the second predetermined pressure. For example, the first predetermined pressure is set higher than the second predetermined pressure.

In the second embodiment, when the defrosting operation is set, refrigerant can be effectively cooled and condensed in the condenser 20 by operating the fan 21. Thus, in the second embodiment, even when the receiver 81 is not provided, the pressure of the high-pressure refrigerant can be controlled in the defrosting operation. In the second embodiment, the other parts are similar to those of the above-described first embodiment.

Third Embodiment

In the third embodiment, a preparative operation is performed for a predetermined time period after the defrosting operation is finished, and thereafter the general operation (refrigerating operation) is performed. In the preparation operation, the compressor 10 is stopped while the switching valve 61 is opened. Accordingly, in the preparation operation, liquid refrigerant stored at least in the condenser 20 can be moved toward the evaporator 30 through the bypass passage 60 by using a pressure difference between the condenser 20 and the evaporator 30.

Immediately after the defrosting operation, refrigerant with a high pressure stays at the side of the condenser 20. In the third embodiment, the pressure difference between the condenser 20 and the evaporator 30 is generated due to the high-pressure refrigerant at the side of the condenser 20, so the refrigerant staying at the side of the condenser 20 can be effectively moved to the side of the evaporator 30 through the bypass passage 60. Therefore, it can prevent the actual condensation capacity of the condenser 20 from being decreased in the general operation (refrigerating operation) after the defrosting operation is performed. Thus, it can prevent the pressure of the high-pressure refrigerant from being excessively increased immediately after the general operation is switched from the defrosting mode.

Figure 7:
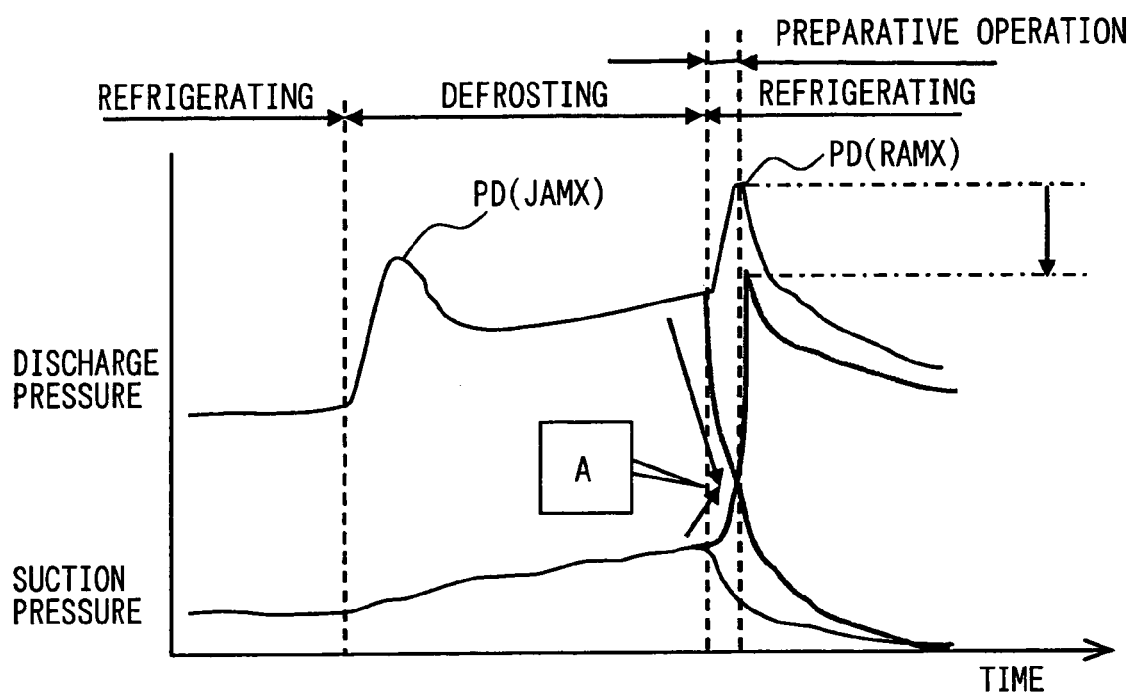
FIG. 7 is a graph showing a discharge pressure of refrigerant from a compressor and a suction pressure of refrigerant sucked into the compressor in a defrosting operation and in a refrigerating operation (general operation), according to a third embodiment of the present invention.

FIG. 7 is a graph showing a discharge pressure of refrigerant discharged from the compressor 10 and a suction pressure of refrigerant to be sucked to the compressor 10 in the defrosting operation and in the refrigerating operation (general operation), according to a third embodiment of the present invention. In FIG. 7, PD(JAMX) indicates the maximum discharge pressure of the refrigerant discharged from the compressor 10 in the defrosting operation, and PD(RAMX) indicates the maximum discharge pressure of the refrigerant discharged from the compressor 10 in the general operation, in the third embodiment. Further, as shown by A in FIG. 7, in the preparation operation, the high-pressure refrigerant at the side of the condenser 10 is moved to the side of the evaporator 30.

Figure 8:
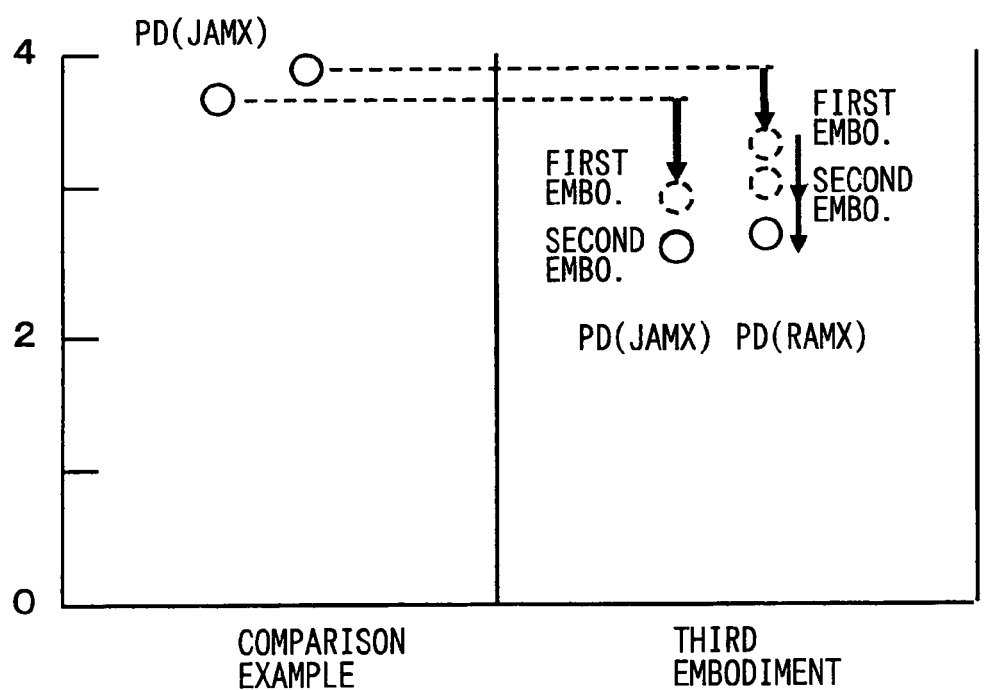
FIG. 8 is a graph showing a maximum discharge pressure PD(RAMX) of refrigerant from the compressor in the general operation and a maximum discharge pressure PD(JAMX) of refrigerant from the compressor in the defrosting operation according to the third embodiment, and showing the maximum discharge pressure PD(RAMX) in the general operation and the maximum discharge pressure PD(JAMX) in the defrosting operation according to the comparison example.

As shown in FIG. 7, in the third embodiment, the maximum discharge pressure PD(JAMX), PD(RAMX) of the refrigerant discharged from the compressor 10 in the defrosting operation can be restricted. In addition, as shown in FIG. 8, in the third embodiment, the maximum discharge pressure PD(RAMX) in the general operation (refrigerating operation) and the maximum discharge pressure PD(JAMX) in the defrosting operation can be reduced as compared with the comparison example, more than the first and second embodiments. Accordingly, it can more effectively prevent the pressure of the high-pressure side refrigerant from being excessively increased at the time immediately after the switching from the defrosting operation to the general operation.

In the experiments of FIGS. 7, 8, the outside air temperature around the condenser 20 is 40° C., and the rotation speed of the compressor 10 is set at 3600 rpm.

In the third embodiment, the other parts are similar to those of the above-described first embodiment.

Fourth Embodiment

Figure 9:
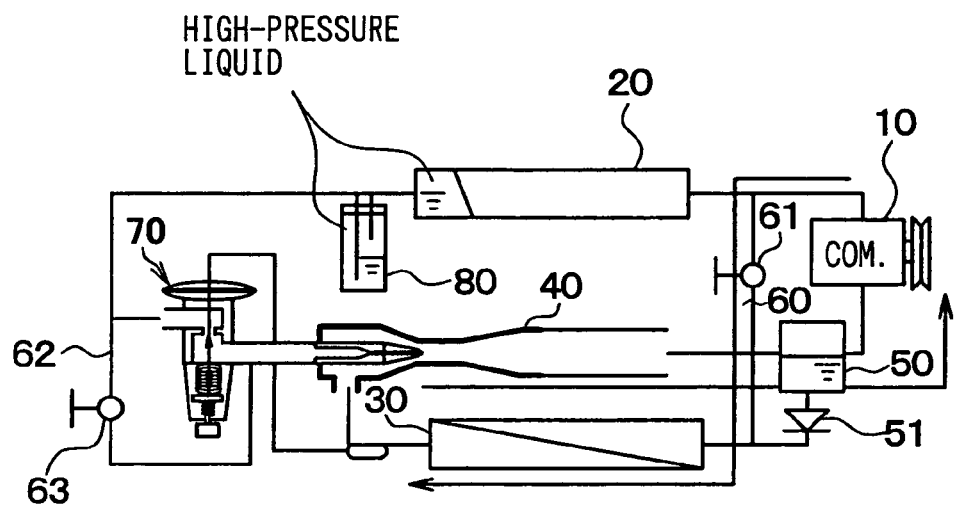
FIG. 9 is a schematic diagram showing an ejector cycle according to a fourth embodiment of the present invention.

FIG. 9 shows an ejector cycle of the fourth embodiment. In the fourth embodiment, as shown in FIG. 9, a second bypass passage 62 through which refrigerant flows while bypassing at least the nozzle 41 is provided. Further, a second switching valve 63 for opening and closing the second bypass passage 62 is provided. At least for a predetermined time after the defrosting operation is finished, a preparation operation where the second switching valve 63 is opened is performed, and thereafter, the general operation is performed. In addition, in the preparation operation, the operation of the compressor 10 is stopped.

Accordingly, in the preparation operation, liquid refrigerant stored in the condenser 20 can be moved toward the evaporator 30 (low-pressure side) through the bypass passage 62 by using a pressure difference between the condenser 20 and the side of the evaporator 30. Immediately after the defrosting operation, refrigerant with a high pressure stays at the side of the condenser 20. In the fourth embodiment, the pressure difference between the condenser 20 and the evaporator 30 is generated due to the high-pressure refrigerant at the side of the condenser 20, so the refrigerant staying at the side of the condenser 20 can be effectively moved to the side of the evaporator 30. Therefore, it can prevent the actual condensation capacity of the condenser 20 from being decreased in the general operation (refrigerating operation) after the defrosting operation is performed. Thus, it can prevent the pressure of the high-pressure refrigerant from being excessively increased immediately after the general operation is switched from the defrosting mode. In the fourth embodiment, the outlet of the second bypass passage 62 can be connected to any a low-pressure side (the side of the evaporator) only when the refrigerant from the condenser 20 flows through the second bypass passage 62 while bypassing at least the nozzle 41. For example, the second bypass passage 62 can be provided so that the refrigerant from the condenser 20 flows through the second bypass passage 62 while bypassing the variable throttle device 70 and the nozzle 41.

Figure 10:
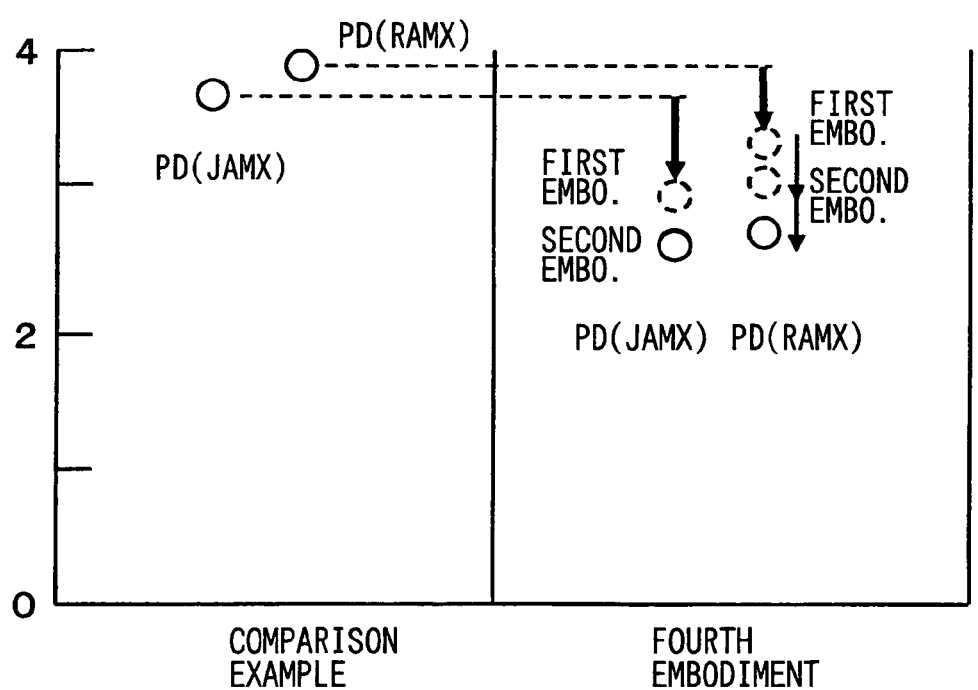
FIG. 10 is a graph showing a maximum discharge pressure PD(RAMX) of refrigerant from the compressor in a general operation and a maximum discharge pressure PD(JAMX) of refrigerant from the compressor in a defrosting operation according to the fourth embodiment, and showing the maximum discharge pressure PD(RAMX) in the general operation and the maximum discharge pressure PD(JAMX) in the defrosting operation according to the comparison example.

In the fourth embodiment, as shown in FIG. 10, the maximum discharge pressure PD(RAMX) in the general operation (refrigerating operation) and the maximum discharge pressure PD(JAMX) in the defrosting operation can be reduced as compared with the comparison example, more than the first and second embodiments. Accordingly, it can more effectively prevent the pressure of the high-pressure side refrigerant from being excessively increased.

In the experiments of FIG. 10, the outside air temperature around the condenser 20 is 40° C., and the rotation speed of the compressor 10 is set at 3600 rpm.

In the fourth embodiment, the other parts are similar to those of the above-described first embodiment.

Fifth Embodiment

In the above-described embodiments, the variable throttle device 70 is a mechanical type. However, in the fifth embodiment, an electrical variable throttle is used as the variable throttle device 70 in the ejector cycle shown in FIG. 1. Further, at least for a predetermined time after the defrosting operation is finished, a preparative operation is performed, and then, the general operation is performed. In the preparative operation of the first embodiment, the variable throttle device 70 is fully opened while the operation of the compressor 10 is stopped.

Accordingly, in the preparative operation, liquid refrigerant staying in the condenser 20 can be moved to the low-pressure side (the side of the evaporator) through the ejector 40 by the pressure different between the condenser 20 and the side of the evaporator 30. As a result, after the general operation is switched from the defrosting operation, it can prevent the pressure of the high-pressure refrigerant from being excessively increased.

Although the present invention has been fully described in connection with the preferred embodiments thereof with reference to the accompanying drawings, it is to be noted that various changes and modifications will become apparent to those skilled in the art.

For example, in the above-described embodiments of the present invention, freon is used as the refrigerant in the ejector cycle. However, the present invention can be applied to an ejector cycle where the other refrigerant can be used. For example, carbon hydride or carbon dioxide can be used as the refrigerant.

In the above-described embodiments of the present invention, the ejector cycle is used for the air conditioner of the vehicle or the room. However, the ejector cycle can be used for a vapor-compression refrigerator for cooling and refrigerating the foods in a showcase.

Further, in the above-described embodiments, refrigerant is decompressed to the gas-liquid two-phase state by the variable throttle device 70, before refrigerant flowing into the nozzle 41 of the ejector 40. However, the variable throttle device 70 is not limited to decompress refrigerant to the gas-liquid two-phase state. That is, the variable throttle device 70 can decompress the high-pressure refrigerant from the condenser 20 to a suitable decompression state, before refrigerant flowing into the nozzle 41 of the ejector 40.

In the above-described embodiments, the variable throttle device 70 and the nozzle 41 can be formed to have an integrated structure, and can be formed as an integrated variable nozzle. Further, in the above-described first to third embodiments, the variable throttle device 70 can be omitted. In this case, high-pressure refrigerant from the condenser 20 is decompressed only by the nozzle 41 of the ejector 40.

Such changes and modifications are to be understood as being within the scope of the present invention as defined by the appended claims.

What is claimed is:

1. An ejector cycle comprising:
    a compressor for compressing refrigerant;
    a condenser for cooling high-pressure refrigerant discharged from the compressor;
    an evaporator for evaporating low-pressure refrigerant after being decompressed;
    an ejector including a nozzle for decompressing and expanding refrigerant flowing from the condenser by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the evaporator;
    a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet side of the evaporator;

a bypass passage through which hot-gas refrigerant discharged from the compressor flows into a refrigerant inlet of the evaporator while bypassing at least the condenser;

a switching valve for opening and closing the bypass passage;

a receiver disposed upstream of the nozzle of the ejector at a refrigerant outlet side of the condenser, to store refrigerant therein in a defrosting operation in which the switching valve opens the bypass passage to introduce the hot-gas refrigerant into the evaporator through the by-pass passage; and a variable throttle device disposed at a refrigerant outlet side of the condenser, for decompressing refrigerant before flowing into the nozzle of the ejector, wherein:

the variable throttle device chances its throttle open degree in accordance with a super-heating degree of refrigerant at a refrigerant outlet side of the evaporator;

when the defrosting operation is set, a part of the refrigerant discharged from the compressor is introduced into the evaporator to remove frost on a surface of the evaporator; and at least for a first predetermined time after the defrosting operation is finished, a first preparative operation, where the variable throttle device is opened while the compressor is stopped, is performed.

2. The ejector cycle according to claim 1, further comprising a blower for blowing air toward the condenser to cool refrigerant in the condenser in a general operation where the refrigerant discharged from the compressor is cooled and condensed in the condenser and refrigerant is evaporated in the evaporator, wherein, in the defrosting operation, the blower is operated.

3. The ejector cycle according to claim 1, wherein:

at least for a second predetermined time after the defrosting operation is finished, a second preparative operation, where the switching valve is opened while the compressor is stopped, is performed.

4. The ejector cycle according to claim 1, wherein:

in a general operation where the refrigerant discharged from the compressor is cooled and condensed in the condenser and refrigerant is evaporated in the evaporator, the variable throttle device changes its throttle open degree in accordance with the super-heating degree of the refrigerant at the refrigerant outlet side of the evaporator;

in the defrosting operation, the switching valve is opened and the variable throttle device is closed; and in the first preparative operation, the variable throttle device is fully opened.

5. An ejector cycle comprising:

a compressor for compressing refrigerant;

a condenser for cooling high-pressure refrigerant discharged from the compressor;

an evaporator for evaporating low-pressure refrigerant after being decompressed;

an ejector including a nozzle for decompressing and expanding refrigerant flowing from the condenser by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the evaporator;

a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet side of the evaporator;

a bypass passage through which hot-gas refrigerant discharged from the compressor flows into a refrigerant inlet of the evaporator while bypassing at least the condenser;

a switching valve for opening and closing the bypass passage;

a receiver disposed upstream of the nozzle of the ejector at a refrigerant outlet side of the condenser, to store refrigerant therein in a defrosting operation in which the switching valve opens the bypass passage to introduce the hot-gas refrigerant into the evaporator through the by-pass passage;

an another bypass passage through which refrigerant from the condenser bypasses at least the nozzle; and an another switching valve for opening and closing the another bypass passage;

when the defrosting operation is set, the another switching valve is closed so that a part of the refrigerant discharged from the compressor is introduced into the evaporator to remove frost on a surface of the evaporator; and at least for a predetermined time after the defrosting operation is finished, a preparative operation, where the another switching valve is opened, is performed.

6. The ejector cycle according to claim 5, wherein the another bypass is provided such that the refrigerant from the condenser bypasses the variable throttle device and the nozzle of the ejector through the another bypass passage.

7. The ejector cycle according to claim 5, wherein, in the preparative operation, the another switching valve is opened while the compressor is stopped.

8. The ejector cycle according to claim 5, wherein at least a part of the variable throttle device is integrated with the ejector.

9. An ejector cycle comprising:

a compressor for compressing refrigerant;

a condenser for cooling high-pressure refrigerant discharged from the compressor;

an evaporator for evaporating low-pressure refrigerant after being decompressed;

a variable throttle device disposed at a refrigerant outlet side of the condenser, for decompressing refrigerant from the condenser;

an ejector including a nozzle for decompressing and expanding refrigerant flowing from the variable throttle device by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the evaporator;

a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet side of the evaporator;

a bypass passage through which refrigerant discharged from the compressor flows into a refrigerant inlet of the evaporator while bypassing at least the condenser; and a switching valve for opening and closing the bypass passage, wherein:

the variable throttle device changes its throttle open degree in accordance with a super-heating degree of refrigerant at a refrigerant outlet side of the evaporator;

when a defrosting operation is set, the switching valve is opened so that at least a part of the refrigerant discharged from the compressor is introduced into the evaporator to remove frost on a surface of the evaporator; and at least for a predetermined time after the defrosting operation is finished, a preparative operation, where the variable throttle device is opened, is performed.

10. The ejector cycle according to claim 1, wherein the receiver has a capacity that is set such that a liquid surface of the liquid refrigerant is positioned at a lower side of a refrigerant inlet through which refrigerant enters into the receiver from the condenser in the defrosting operation.

11. The ejector cycle according to claim 9, further comprising:

a receiver disposed upstream of the nozzle of the ejector at a refrigerant outlet side of the condenser, to store refrigerant therein.

12. The ejector cycle according to claim 9, wherein:

in a general operation where the refrigerant discharged from the compressor is cooled and condensed in the condenser and refrigerant is evaporated in the evaporator, the variable throttle device changes its throttle open degree in accordance with the super-heating degree of the refrigerant at the refrigerant outlet side of the evaporator;

in the defrosting operation, the switching valve is opened and the variable throttle device is closed; and in the preparative operation, the variable throttle device is fully opened.

* * * * *